US006691038B2

United States Patent
Zajac (12) United States Patent
(10) Patent No.: US 6,691,038 B2
(45) Date of Patent: Feb. 10, 2004

(54) ACTIVE SEPARATION TRACKING AND POSITIONING SYSTEM FOR TOWED SEISMIC ARRAYS

(75) Inventor: Mark Zajac, Katy, TX (US)

(73) Assignee: WesternGeco L.L.C., Houston, TX (US)

(*) Notice: Subject to any disclaimer, the term of this patent is extended or adjusted under 35 U.S.C. 154(b) by 174 days.

(21) Appl. No.: 09/882,952

(22) Filed: Jun. 15, 2001

(65) Prior Publication Data

US 2003/0208320 A1 Nov. 6, 2003

(51) Int. Cl.⁷ .................................................. G01V 1/38
(52) U.S. Cl. .......................................... 702/14; 367/20
(58) Field of Search ....................... 702/14, 16; 367/16, 367/72, 20, 19, 17; 114/244, 245, 246

(56) References Cited

U.S. PATENT DOCUMENTS

| 4,676,183 A | * | 6/1987 | Conboy ........................ 114/245 |
| 4,729,333 A | * | 3/1988 | Kirby et al. ................. 114/244 |
| 4,890,568 A | * | 1/1990 | Dolengowski ............... 114/246 |
| 5,771,202 A | | 6/1998 | Bale et al. ..................... 367/20 |
| 5,784,335 A | * | 7/1998 | Deplante et al. .............. 367/72 |
| 5,790,472 A | | 8/1998 | Workman et al. .............. 367/19 |
| 5,920,828 A | * | 7/1999 | Norris et al. ................... 702/14 |
| 6,011,752 A | | 1/2000 | Ambs et al. .................... 367/17 |
| 6,028,817 A | | 2/2000 | Ambs ............................... 367/16 |
| 6,418,378 B1 | * | 7/2002 | Nyland ........................... 702/14 |

FOREIGN PATENT DOCUMENTS

| EP | 0613025 A1 | * | 8/1994 | ............ G01V/1/38 |
| EP | 0909701 A2 | | 4/1999 | ............ G01V/1/38 |
| GB | 2122562 A | * | 1/1984 | ............ B63B/21/66 |
| GB | WO 98/28636 | | 7/1998 | ............ G01V/1/38 |
| WO | WO 00/20895 | | 4/2000 | ............ G01V/1/38 |
| WO | WO 01/16623 | | 3/2001 | ............ G01V/1/38 |

OTHER PUBLICATIONS

Morice et al., SPE 63136: 4D–Ready Towed–Streamer Data and the Foinaven Benchmark, Oct. 2000, pp. 1–7.

Marine Lateral Steering Advance Unveiled, Petroleum Engineer International, Hart Publications, US, vol. 73, No. 8, Aug. 2000, p. 113.

* cited by examiner

Primary Examiner—John Barlow
Assistant Examiner—Victor J. Taylor
(74) Attorney, Agent, or Firm—Madan, Mossman & Sriram, P.C.

(57) ABSTRACT

A method and apparatus comprising an active control system for a towed seismic streamer array that enables any relative positional control of any number of towed seismic streamers. The streamer positions are controlled horizontally and vertically using active control units positioned within the seismic array. The three component (x, y, z) position of each streamer element, relative to the vessel and relative to each other is controlled, tracked and stored during a seismic data acquisition run. The present invention enables a seismic array to be maneuvered as the towing vessel maintains course, enables maintenance of specific array position and geometry in the presence of variable environmental factors and facilitates four-dimensional seismic data acquisition by sensing and storing the position of the array and each array element with respect to time.

50 Claims, 6 Drawing Sheets

ACTIVE SEPARATION TRACKING AND POSITIONING SYSTEM FOR TOWED SEISMIC ARRAYS

CROSS REFERENCE TO RELATED APPLICATIONS

This is related to U.S. patent application Ser. No. 09/603,068, filed on Jun. 26, 2000 entitled "Optimal Paths for Marine Data Collection" which is hereby incorporated herein by reference. This is related to U.S. patent application Ser. No. 09/658,846, filed on Nov. 11, 2000 entitled "Neural Network Prediction of Seismic Streamer Shape" which is hereby incorporated herein by reference.

FIELD OF THE INVENTION

The present invention relates generally to a method and apparatus for controlling sea borne seismic data acquisition systems comprising an array of streamers, and in particular to the relative vertical and horizontal positioning of seismic streamers forming a seismic array towed behind a sea borne towing vessel.

DESCRIPTION OF THE RELATED ART

The related art discloses a wide variety of towed marine seismic tracking and positioning systems and methods typically comprising one or more seismic streamers and/or one or more seismic sources. Some these seismic tracking and positioning systems and methods utilize a main or host vessel and/or other-associated unmanned vessels or vehicles to tow the seismic array. Typically towing is controlled or guided by a central control system. The known marine seismic tow tracking and positioning systems and methods are comprised of apparatuses such as seismic hydrophone streamers and attached floats, paravanes, and/or buoyant members. Typically each streamer and control apparatus is connected to the host vessel by a line, cable or tether. Considerable towing power is required of a host vessel to tow existing seismic streamer systems, cables and interconnecting sensing devices. A typical host vessel is capable of towing a plurality of tow vessels and/or carrying a plurality of seismic streamers or arrays and associated support apparatus on the vessel's deck awaiting deployment.

One such tracking and positioning system for positioning and control of marine seismic streamers is taught in the international application published under the Patent Cooperation Treaty (PCT), International Publication Number WO 00/20895, international publication date Apr. 13, 2000. A marine seismic system with independently power tow vehicles is taught by U.S. Pat. No. 6,028,817. A control device for controlling the position of a marine seismic streamer is taught in the international application published under the Patent Cooperation Treaty (PCT), International Publication Number WO 98/28636, international publication date Jul. 2, 1998.

With known seismic cable tracking and positioning systems, the location and spacing of system components is limited by the type, size, and length of cables used and by the characteristics of the towing vehicles and other control devices utilized by the known seismic tracking and positioning systems. Typically, the plurality of towed seismic streamers form an array which is towed behind the host vessel. Typically, changing the configuration of such a towed streamer array, comprised of known components is a complex, cumbersome, time-consuming operation and can often become somewhat unwieldy. Moreover, the spatial and temporal positioning capability of known towing and tracking and positioning systems is limited.

There is no known seismic tracking and positioning system that enables independent and relative positioning of individual seismic streamer array elements, for example "birds", seismic streamers, comprising sensors, sources and depth and position controls, for example to configure, manipulate and/or maintain a desired geometry of and within a towed seismic streamer array. There is also no known seismic tracking and positioning system that enables relative positioning and manipulation of an entire seismic streamer array. There is also no known tracking and positioning system that enables specification of a plurality of diverse acquisition and ancillary non-acquisition array geometries that facilitates run-time maintenance, retrieval and deployment of a towed seismic array. Moreover, there is no known seismic tracking and positioning system that tracks the geometry of the seismic streamer array and the relative positions of the individual streamers comprising array elements with respect to time and with respect to the earth's latitude and longitude so that towed seismic array data acquisition runs are repeatable, thereby enabling acquisition of four-dimensional geophysical data (x, y, z, time).

Thus, there is a need for a seismic acquisition tracking and positioning system that overcomes the above-mentioned shortcomings of known seismic data acquisition tracking and positioning systems. There has been a long-felt need for an efficient and effective towed marine seismic tracking and positioning system having system components that are easily and reliably tracked, controlled and positioned. There has also been a long-felt need for seismic data acquisition towing, tracking and positioning systems to provide sufficient positioning flexibility to enable efficient, accurate, and repeatable control of the relative and absolute horizontal and vertical positions of towed arrays and the streamers, sensors and sources within a towed array during seismic data acquisition.

SUMMARY OF THE INVENTION

The present position invention provides a method and apparatus for an active tracking and positioning system for a towed seismic streamer array. The present invention recognizes and addresses the previously mentioned shortcomings, problems and long-felt needs associated with known towed seismic tracking and positioning systems. The present invention provides a solution to the aforementioned problems and provides satisfactory meeting of those needs in its various embodiments and equivalents thereof.

The active tracking and positioning system of the present invention provides a method and apparatus that enables relative positional control of any number of towed seismic streamers. The present invention controls streamer positions horizontally and vertically using active control units positioned on each streamer within the seismic array. The three component (x, y, z) position of each streamer element, relative to the vessel, relative to each other and relative Earth coordinate latitude and longitude is controlled, tracked and stored with respect to time during each seismic data acquisition run. This stored data is referred to as legacy data. Environmental factors (wind speed, currents, temperature, salinity, etc), and maneuverability data for the streamers and geometry of the towed array (cable diameter, array type, deployed configuration, vessel type, device type, etc.) for the seismic data acquisition run are also sensed with respect to time and stored as legacy data. The acquisition of legacy data enables repetition of seismic data acquisition runs.

The present invention provides active streamer positioning devices (ASPDs) as control elements, which are installed on individual streamers comprising an array, alternatively at the diverter position, streamer head, along the length of the streamer or at the tail of the streamer. One or more ASPD is employed on each seismic array. The active control elements are also installed at the head tow point of an array, at the head or tail of one or more streamers comprising an array, and/or along any streamer comprising an element of an array. The control elements attached at the streamer head are alternatively detachably connected to the front of the array to facilitate detachment and removal of a single streamer element from the array during a data acquisition run.

The apparatus and method of the present invention enables a seismic array to be maneuvered as the towing vessel maintains it desired course or as the towing vessel maneuvers to assist in the repositioning of the array during a seismic data acquisition run. The present invention may alternatively employ methods such as force vectoring, active wings, or other known means of changing the spatial or temporal, that is the vertical or z-depth position of the streamer elements comprising the array. In addition to enabling change in the spatial and temporal positions of individual array elements, the tracking and positioning system enables maintenance of specific array position and geometry in the presence of variable environmental factors. In this mode, the control system of the present invention adjusts the lifting force of the streamer to accommodate variations in the tide, real-time current velocity and direction, water depth, towed speed, cable maneuverability, towed direction and water salinity, and salinity variations, all of which may affect the buoyancy and position of the towed seismic array. The salinity of the water in which the array is towed may vary abruptly when a salt water towing operation passes by the mouth of a fresh water supply such as a river. The salinity may diminish considerably in the fresh water region near the mouth of a river, thereby requiring adjustment of the array towing forces to maintain desired array geometry and depth.

The present invention enables repeatable, four-dimensional seismic data acquisition by sensing and storing environmental data, temperature sensitive array maneuverability data and positional tracking data for a towed array and each individual element of the towed array with respect to time. The relative horizontal and vertical positioning of each seismic cable and energy source independent of the streamer attached to the array or streamer is controlled, monitored and stored, along with real-time environmental data during a seismic data acquisition operation. The composite stored data comprises legacy data for the data acquisition run. Thus, a seismic data acquisition run can be duplicated at a later date to reproduce the same array geometry and path during subsequent data acquisition runs, in the presence of varying environmental and maneuverability conditions. That is, a particular seismic data acquisition operation is repeatable based on the legacy data, thereby enabling repeatable four-dimensional data (x, y, z, time) gathering for multiple runs over a seismic target area. The present invention also enables implementation of non-acquisition ancillary array configurations such as augmented array geometry for collapsing or expanding an array during deployment or retrieval. The present invention also enables raising a single array element for retrieval from a deployed array during acquisition.

One array section or one streamer of an array section can be deflected out of the array geometry during a data acquisition run and vertically to the surface for detachment, retrieval and/or maintenance. The present invention also enables compensation for a failed or missing streamer. Streamers adjacent a failed or missing/removed streamer can be moved closer together to compensate for the failed or missing streamer array element with or without removal of the element. This enables repair and/or removal and replacement of such a failed array element during a seismic data acquisition run without interruption of the data acquisition run to repair and or replace the disabled streamer. Runtime removal of streamers and compensation for failed streamers enables continuation of data acquisition without causing the vessel and/or array to deviate from its planned data acquisition path.

It is time consuming, difficult and expensive to interrupt the towing vessel during a data acquisition run. Interruption for replacement or repair a streamer element in a data acquisition array and a subsequent attempt to duplicate array geometry and reposition the array and necessitates starting the vessel and array again at the exact location and array geometry where the run data acquisition run was interrupted. This process is difficult and time consuming, if not impossible. The present invention enables compensation for an array element and continuation of a data acquisition run during repair and replacement of the array streamer element.

The instant invention also enables configuring the towed array geometry to compensate for changing environmental and operational conditions that affect maneuverability. The array geometry can also be configured to increase or decrease the temporal resolution and spacing of the array to avoid ghost notching. Deployment and ancillary configurations are also provided wherein, for example, the width of an array may be increased to reduce chances of streamer tangling during deployment. The present invention also enhances in fill shooting where an optimal path has been selected. The present invention enables movement of the array in conjunction with movement of the vessel along an optimal in fill shooting path. The present invention individually controls positioning of the vessel and positioning of the array. Thus, the present invention also enables the towing vessel to account for a portion of the positioning along the selected optimal in fill path or data acquisition path and positioning of the array to account for the remainder of the positioning along the path. This division of positioning movements between the vessel and the array provides a more flexible and efficient positioning system for use during in fill shooting and/or other data acquisition positioning maneuvers.

In one aspect of the invention a seismic streamer array tracking and positioning system is presented comprising a towing vessel for towing a seismic array; an array comprising a plurality of seismic streamers; an active streamer positioning device (ASPD) attached to at least one seismic streamer for positioning the seismic streamer relative to other seismic streamers within the array; and a master controller for issuing positioning commands to each ASPD for maintaining a specified array geometry. In another aspect of the invention the apparatus further comprises an environmental sensor for sensing environmental factors which influence the path of the towed array. In another aspect of the invention the apparatus further comprises a tracking system for tracking the streamer positions versus time during a seismic data acquisition run and storing the positions versus time in a legacy database for repeating the positions versus time in a subsequent data acquisition; and an array geometry tracking system for tracking the array geometry versus time during a seismic data acquisition run and storing the array geometry versus time in a legacy database for repeating the array geometry versus time in a subsequent data acquisition run.

In another aspect of the invention the apparatus further comprises a master controller which compares the positions of the streamers versus time and the array geometry versus time to a desired streamer position and array geometry versus time and issues positioning commands to the ASPDs to maintain the desired streamer position and array geometry versus time. In another aspect of the invention the apparatus further comprises a master controller that factors in environmental factors into the positioning commands to compensate for environmental influences on the positioning of the streamers and the array geometry.

In another aspect of the invention the apparatus further comprises a master controller which compensates for maneuverability in the positioning commands to compensate for maneuverability influences on the positioning of the streamers and the array geometry. In another aspect of the invention the apparatus further comprises a monitor for determining the status of each streamer, wherein the master controller adjusts the array geometry to compensate for a failed streamer. In another aspect of the invention the apparatus further comprises a monitor for determining the status of each streamer, wherein the master controller adjusts the array geometry to move a failed streamer out of the array. In another aspect of the invention the apparatus further comprises a monitor for determining the status of each streamer, wherein the master controller detaches a failed streamer from the array. In another aspect of the invention the apparatus further comprises an array geometry which comprises a plurality of streamers positioned at a uniform depth. In another aspect of the invention the apparatus further comprises array geometry comprising a plurality of streamers positioned at a plurality of depths for varying temporal resolution of the array.

In another aspect of the invention the apparatus further comprises an array geometry comprising a plurality of streamers positioned along a plane, wherein the plane is rotated at an angel theta with respect to the longitudinal axis of the array. In another aspect of the invention the apparatus further comprises an apparatus wherein the array geometry is tracked via satellite and communicated to the master controller.

In another aspect of the invention a method is provided for tracking and positioning a seismic streamer array comprising a towing vessel for towing a seismic array; providing a seismic streamer array comprising a plurality of seismic streamers; providing an active streamer positioning device (ASPD) attached to each seismic streamer for positioning each seismic streamer; providing a master controller for issuing positioning commands to each ASPD and to the towing vessel for maintaining an optimal path, wherein the master controller further comprises a processor for calculating an optimal path for the seismic array for optimal coverage during seismic data acquisition over a seismic field, and a streamer behavior prediction processor which predicts array behavior, wherein the master controller compensates for predicted streamer behavior in issuing positioning commands to the towing vessel and the ASPDs for positioning the array along the optimal path, wherein the master controller compensates for environmental and maneuverability factors in the positioning commands.

BRIEF DESCRIPTION OF THE DRAWINGS

Other objects and advantages of the invention will become apparent upon reading the following detailed description and upon reference to the accompanying drawings in which.

DETAILED DESCRIPTION OF A PREFERRED EMBODIMENT

To one skilled in this art who has the benefit of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

Figure 1:
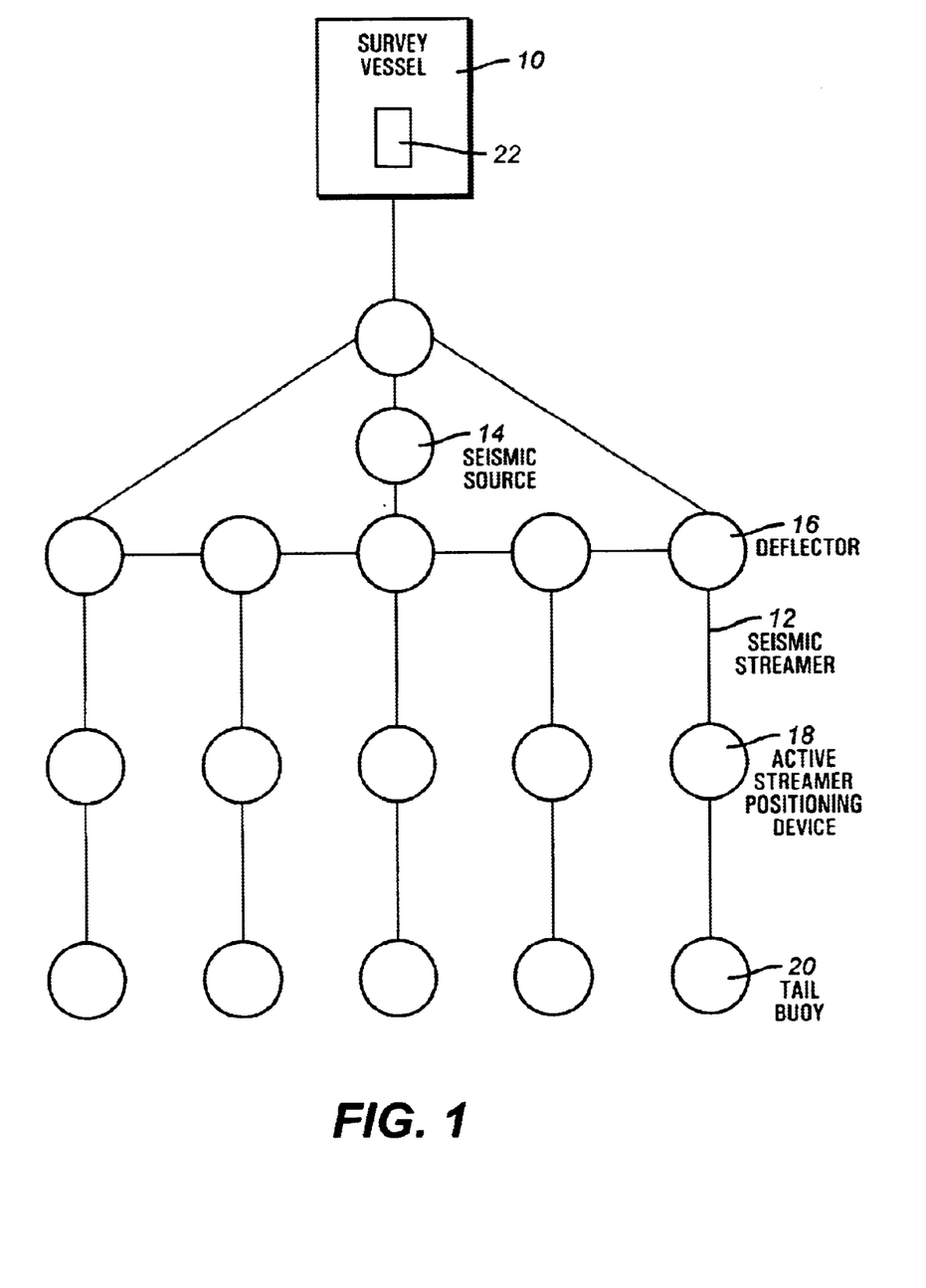
FIG. 1 is a schematic diagram of a seismic survey vessel and associated seismic data acquisition tracking and positioning system.

Turning now to FIG. 1, a seismic survey vessel 10 is shown towing a plurality of marine seismic streamers 12 that may, for instance be 3000 meters in length. The outermost streamers 12 in the array can be as much as 400 meters apart, resulting in a horizontal displacement between each streamer of 100 meters, in an equally-spaced array configuration. A seismic source 14, typically an airgun or one or more array of airguns, is also shown towed behind the seismic survey vessel 10.

As shown in FIG. 1, at the front of each streamer 12 is shown a detachable deflector 16 and at the rear of every streamer is shown a detachable tail buoy 20. In a preferred embodiment, a detachable, active streamer positioning device 18 (ASPD) can be supplemented or substituted for the deflector 16 and/or tail buoy 20. The detachable deflector 16 is used to horizontally position the front end of the streamer nearest to the seismic survey vessel 10. The tail buoy 20 creates drag at the backend of the streamer farthest away from the seismic vessel 10 and provides a platform for absolute positioning or relative positioning at the tail of the streamer. The tension created on the seismic streamer by the deflector 16 and the tail buoy 20 results in the roughly rectilinear shape of the seismic streamer 12 shown in FIG. 1.

The rectilinear shape of the streamer can be maintained by the present invention to overcome side currents and tides which may affect the shape of the towed cable and cause it to deviate from a preferred rectilinear shape. A rectilinear shape is preferred to maintain array geometry for accurate and repeatable seismic data acquisition runs. Deviation from a rectilinear cable shape can cause undesirable variations in the data gathered from the array. The present invention enables sensing and correction of deviations is the preferred shape of a towed streamer array.

Located between the deflector 16 and the tail buoy 20 are a plurality of ASPDs 18. Preferably the ASPDs 18 are both vertically and horizontally steerable. These ASPDs 18 may, for instance, be located at regular intervals along the individual streamers, such as every 200 to 400 meters. The vertically and horizontally steerable ASPDs 18 can be used to constrain and configure the shape of the seismic streamer 12 between deflector 16 and the tail buoy 20 in the vertical (z or depth) and horizontal (x, y) directions. The ASPDs 18 can be placed at the head end of a streamer, at the tail end of the streamer or at any place along the streamer in between the streamer head end and streamer tail end.

Figure 2:
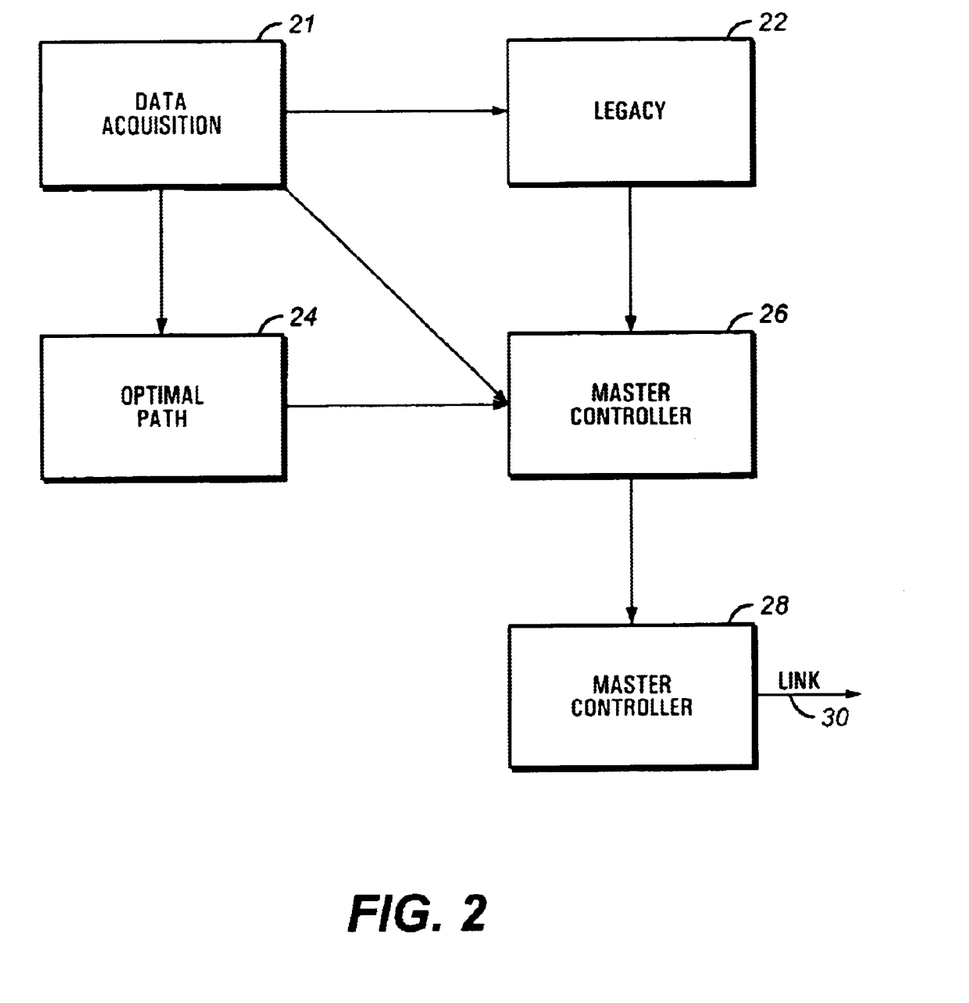
FIG. 2 is a schematic diagram for the preferred array geometry tracking and positioning system showing real-time and legacy data storage and acquisition.
Figure 6:
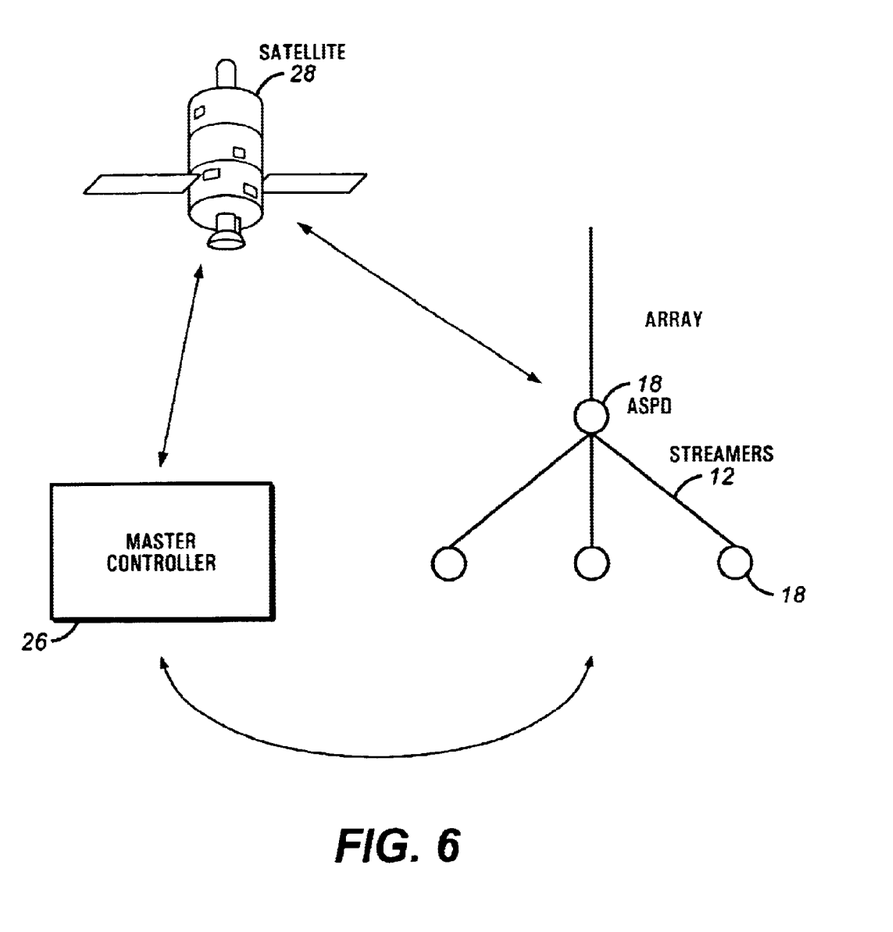
FIG. 6 is a schematic diagram showing the tracking and positioning communication path provided by the present invention.

Turning now to FIG. 2, in a preferred embodiment of the present invention, the control system for the ASPD 18 may be distributed between a master controller 26 located remotely on the towing vessel (or at any other location on land, sea or satellite) and a group of one or more separate controllers 18 built into one or more ASPDs 18, which is positioned on streamer 12 within the seismic array. The master controller 26 may be located remotely and communicate via satellite or other communication means as shown in FIG. 6. The master controller receives data representing individual position of at least one point on the array, but preferably one or more points on each streamer element. These streamer positions from individual ASPDs 18, are processed, compared to the desired positions and commands are transmitted to the individual ASPD 18. The link between the active controllers on ASPD 18 and the main controller 26 can be accomplished by any suitable electronic cable, such as coaxial or fiber-optic cable attached to the towed array, via point to point communications or RF communications facilitated by a transceiver attached to the towed array. As shown in FIG. 6, the tracking information from a plurality of points on individual streamers comprising the seismic array can be obtained and transmitted to the master controller 26 via satellite or radio frequency or any other means of communication.

The master controller may be connected via an electronic data bus, via any other suitable physical data interface, or via a wireless communication data interface to collect inputs from environmental sensors associated with vessel 10. Sensed environmental data comprises wind speed and direction; tidal currents velocity and direction; ocean bottom depth/angle; local current velocity and direction; wave height and direction; ocean bottom depth/angle; and water temperature and salinity.

Turning now to FIG. 2, the master controller 26 of the present invention receives the three component position of each active controller in the array, as shown in FIG. 6. Thus, the present invention enables tracking with respect to time, of each individual ASPD and the streamer cable with which the ASPD is associated. Each active controller element is also equipped with a receiver for receipt of commands generated and formatted by the master control 26 and transmitted by active position commander 28. The commands are sent to the ASPDs 18, to instruct each of the ASPDs regarding commands for changing the position of each individual streamer to maintain desired array geometry and overall position. The positioning commands can be absolute commands or represent changes in position from the last command to the particular ASPD. The flexibility of the individual ASPD 18 enables precise positioning of each individual ASPD and associated streamer within the towed streamer array. The present invention enables control of the horizontal, vertical and depth position of the entire array geometry comprising the individual streamers, individual streamers and attached ASPDs, with respect to time.

The array, streamer and individual ASPD three-component (x, y, z) position data with respect to time is stored along with real time environmental data. Environmental data is received via cable or radio from sensors deployed from the vessel or the array. The stored position and environmental data is stored as legacy data in the legacy data storage 22. Optimal path data, is generated by Optimal path processor 24, which may be generated by a neural network or some other methodology such as human input or mathematical formulae, is input to master controller 26. Optimal path data may be provided as a desired seismic acquisition path during primary seismic data acquisition or during in fill shooting. Optimal path data steering is preferably divided between an optimal path for the tow vessel 10 and an optimal path for the towed array. During seismic data acquisition utilizing an optimal path 24, vessel, array, array element and ASPD positions are sensed along with environmental data are transmitted to and received by the data acquisition unit 21. The data acquisition unit 21 stores these inputs with respect to time as legacy data in the legacy data storage 22. The data acquisition unit 21 also passes the array and environmental tracking data to the master controller 26. The maneuverability of the particular cable, ASPD and vessel under the particular sensed environmental conditions are also factored into the active positioning commands. For example, a cable that becomes stiffer in colder water or more buoyant in higher salinity receives an augmented steering command depending on the sensed environmental data. Master controller 26 compares the current vessel and array position data with the desired position or optimal vessel and array path position. The master controller 26 then determines, in light of the current environmental conditions and the maneuverability of the vessel, ASPDs and towed streamers comprising the array, the timing and magnitude of positioning commands to be sent to the ASPDs on the array. The positioning commands are formatted and transmitted by active position commander 28 over link 30. Link 30 may be hardwired or wireless via satellite, laser or radio link.

In a preferred embodiment optimal path processor 24 collects real-time positioning data for the seismic array and for the towing vessel along with environmental data and maneuverability data for the array and towing vessel. The optimal path processor 24 computes predictions for the array behavior and computes the optimal path through the seismic survey area during a data acquisition run. The master control receives the predicted array behavior and takes it into account in generating and issuing positioning commands to the array ASPDs and the towing vessel. The division of the steering commands between the towing vessel and the ASPDs provides additional flexibility and control over the array along the optimal path. The additional flexibility and control of the array long the optimal path reduces the amount of in fill shooting required after a primary data acquisition run and reduces the amount of decision making required of a navigator striving to properly steer the towing vessel during a data acquisition run.

In a preferred embodiment of the present invention, the master controller monitors the actual position of each ASPD to determine the position of the streamers and the composite array geometry comprising the streamers and control elements are tracked and stored as legacy data. The actual positions of vessel, streamers, ASPDs and array geometry are compared to the desired vessel/streamers/ASPD positions and array geometry and corrective position commands are sent to the control elements to move the vessel/streamers/ASPDs to the desired position and array geometry. Tracking data and positioning commands are transmitted between the master controller and active positioners via a cable connecting the master controller and the active positioners or via wireless communications.

The horizontal positions of the ASPDs 18 and/or active controllers can be derived using acoustic position systems as described in U.S. Pat. No. 4,992,990. In the alternative, satellite-based global positioning systems may be utilized separately or in conjunction to determine the positions of the array and the active controllers and streamers comprising the array. The depth of the arrays, and of the individual streamers and individual streamer elements can be determined using pressure sensors.

In calculating desired or necessary movements by vessel, streamers/array and individual ASPDs, to maintain the desired array geometry and position and the relative position of the array elements as well as the desired array position and geometry during four-dimensional data acquisition, the master controller 26 takes into account environmental factors including but not limited to water salinity, current velocity and direction as well as legacy tracking data to adjust the positioning commands provided to the active controller. The master controller also factors in the maneuverability of the streamer cable and streamer array based on the cable diameter and cable type. The master controller sends position correction commands to the active controller either as a desired position or as a force vector comprising the vertical deflection, horizontal deflection, towing velocity and cross current velocity.

The vessel towing velocity and cross current velocity may be calculated from the vessel speed and heading values and the current speed and heading values to determine the relative velocities of the streamers, active controllers and the array. In an alternative embodiment, the towing velocity and/or cross current velocity can be determined using flow meters or other commercially available water velocity meters. Thus, the present invention enables dynamic adaptive geometric configuration, tracking and control to compensate for changes in local currents, tides and salinity of the water during seismic data acquisition.

In an alternative embodiment, a neural network is provided to model and predict cable and array behavior in the presence of changing currents, tides and salinity, or other environmental factors such as wave height, wind, water temperature, etc. The present invention may also factor in compensation for streamer buoyancy, streamer diameter, maneuverability of the cable with respect to the current temperature, streamer and vessel maneuverability and combined streamer/ASPD positioning maneuverability as well as particular array geometry and spacing. The neural network is preferably trained to compensate for changes in such environmental factors in combination with the vessel and streamer/ASPD positioning maneuverability. The present invention thereby enables repeatable and consistent array geometry and positioning for collection of four-dimensional data on separate seismic data acquisition runs using different streamers having different streamer/ASPD maneuverability and under different environmental conditions.

For example, a first data acquisition run may occur during the summer when the water temperature, salinity, tides, winds and currents comprise a first set of data for a first streamer system having a first maneuverability. A second data acquisition run may occur during the winter, years later, when the water temperature, salinity, tides, winds and currents comprise a second set of data for a second streamer/ASPD system possessing a second maneuverability. In order to replicate the first data acquisition run and obtain four-dimensional data during the second data acquisition run; the present invention compensates for the differences between the environmental factors and the differences in vessel/streamers/ASPD maneuverability of the first and second run to accurately repeat the array positioning and geometry during the second run, thereby enabling repeatable seismic acquisition runs and the acquisition of four-dimensional data. The difference maneuverability of the first and second vessels is also considered by the master controller in selecting ASPD positioning commands.

The present invention enable precise maneuvering the individual streamers, the array position and the array geometry, thereby reducing in fill shooting caused by array geometry that is either too broad, too narrow or simply out of position. The present invention also determines and corrects for inappropriately shaped arrays, for example, elements in the array which become non symmetric are adjusted and moved into position so that array geometry errors in x, y, and z space are corrected and compensated by the present invention. The present invention also enables placement of streamers in close proximity without entanglement.

Figure 3A:
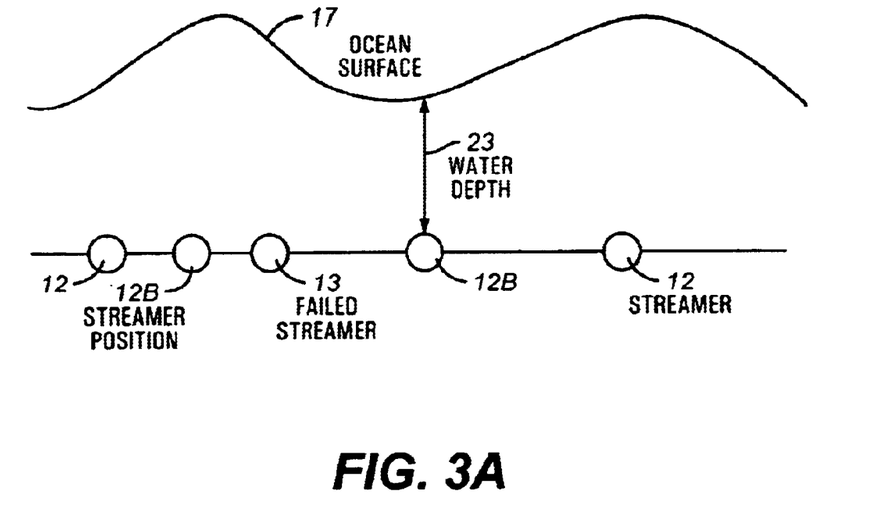
FIGS. 3A, 3B, 3C and 3D illustrate a schematic diagram of a towed seismic streamer array showing deflection of a failed streamer to the surface and compensation for the failed streamer by adjacent streamers.
Figure 3B:
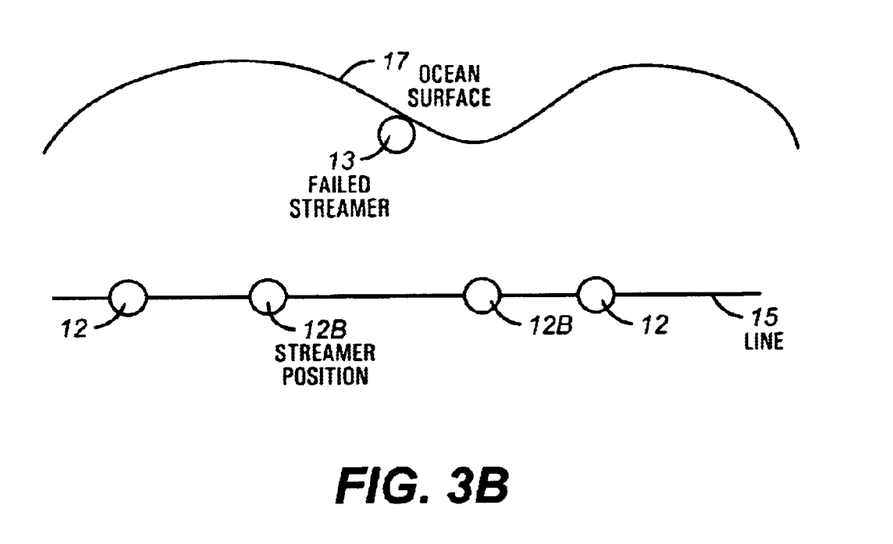
Figure 3C:
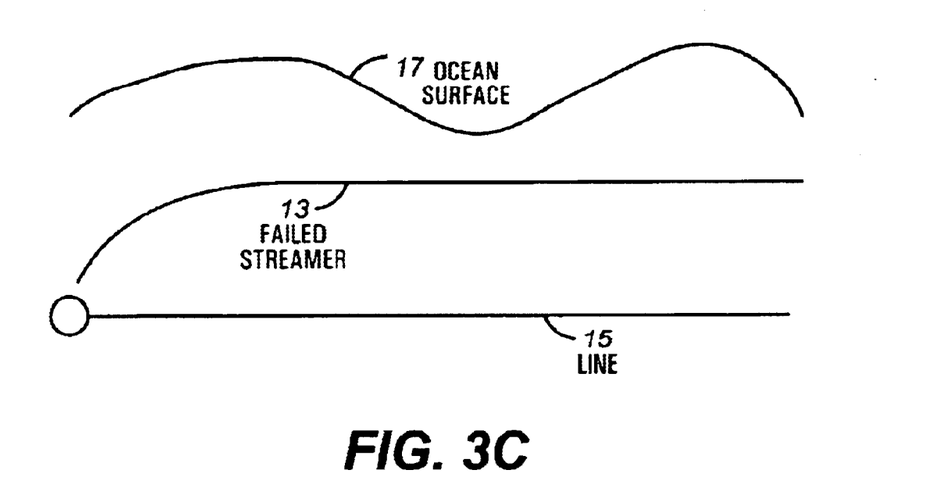
Figure 3D:
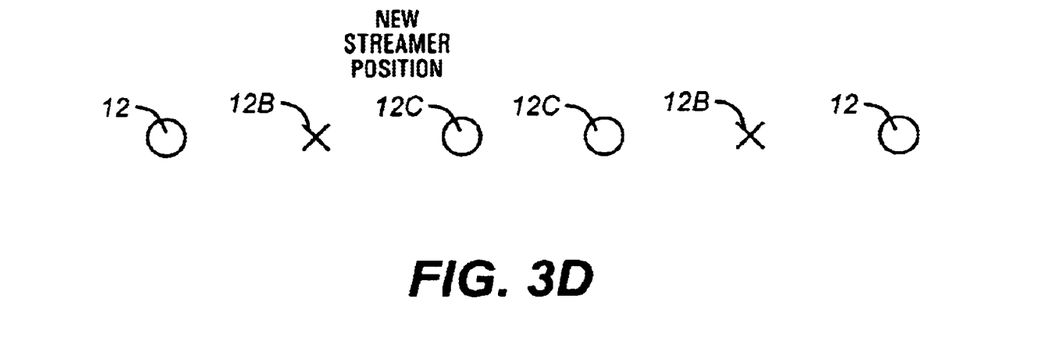

Turning now to FIG. 3A, a cross section is illustrated, taken perpendicular to the longitudinal axis of the towed array of streamers 12 shown in FIG. 1. In FIG. 3A, the array of streamers 12 is positioned at the same water depth 23, along line 15 at depth 23, and beneath the ocean surface 17. A failed streamer 13 originally positioned along line 15 is detected as failed by the master controller. The master controller issues a positioning command to the ASPD on the failed streamer 13. As shown FIG. 3B, the failed streamer cable 13 is maneuvered and lifted above line 15 to the surface of the water and out of the array geometry for replacement and or repair during a data acquisition run. A side view of failed streamer 13, is shown in the raised position in FIG. 3C. As shown in FIG. 3D, array geometry can also be altered by the present invention to alter the beam pattern and/or coverage of the array by moving the streamers adjacent the failed streamer to replace and compensate for failed streamer cable 13. As shown in FIG. 3D, the streamers in position 12B adjacent streamer 13 are moved closer together, from position 12B to position 12C, to compensate for streamer 13 which has been removed from the array. In a preferred embodiment, all streamers including streamer 13 are detachably connected to the streamer array so that each streamer can be easily removed during seismic data acquisition operations. The master controller 26 detects the failed streamer 13, commands the ASPD attached to failed streamer 13 to raise streamer 13 to the surface 17. Once on or near the surface, or simply physically displaced from the array, a manned or unmanned support vehicle can retrieve and or remove and replace streamer 13. The master controller issues positioning commands to adjust the position of streamers adjacent streamer 13 without interrupting the seismic data acquisition run.

Thus, the present invention senses a failed streamer cable in an array geometry and adjusts the position of adjacent streamer cables so that the beam pattern of the sensing array covers the area covered by the failed streamer. The compensation for a failed array streamer and associated compensation array geometry are noted and stored by the present invention so that post processing analysis compensates for variations in the data caused by the compensation array geometry.

Figure 4:
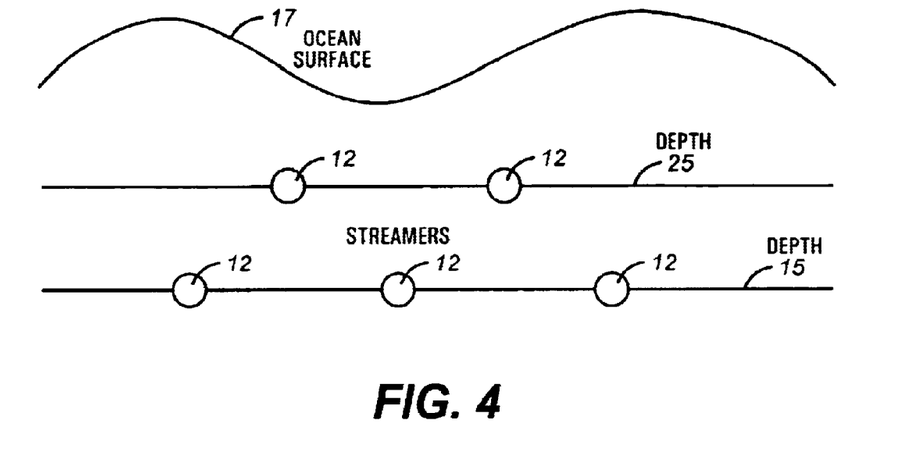
FIG. 4 is a schematic diagram of a towed seismic streamer array showing a alternative array geometry for increasing temporal resolution of the towed array.

Turning now to FIG. 4, a three-dimensional array of streamers 12 is shown. The three-dimensional array of FIG. 4 positions the streamers 12 at varying depths 15 and 25, rather than along a single line at a uniform depth. The varying depths of the streamers increases the temporal resolution of the streamer and substantially eliminates ghost notching. The depths can vary between two or more depths.

Figure 5:
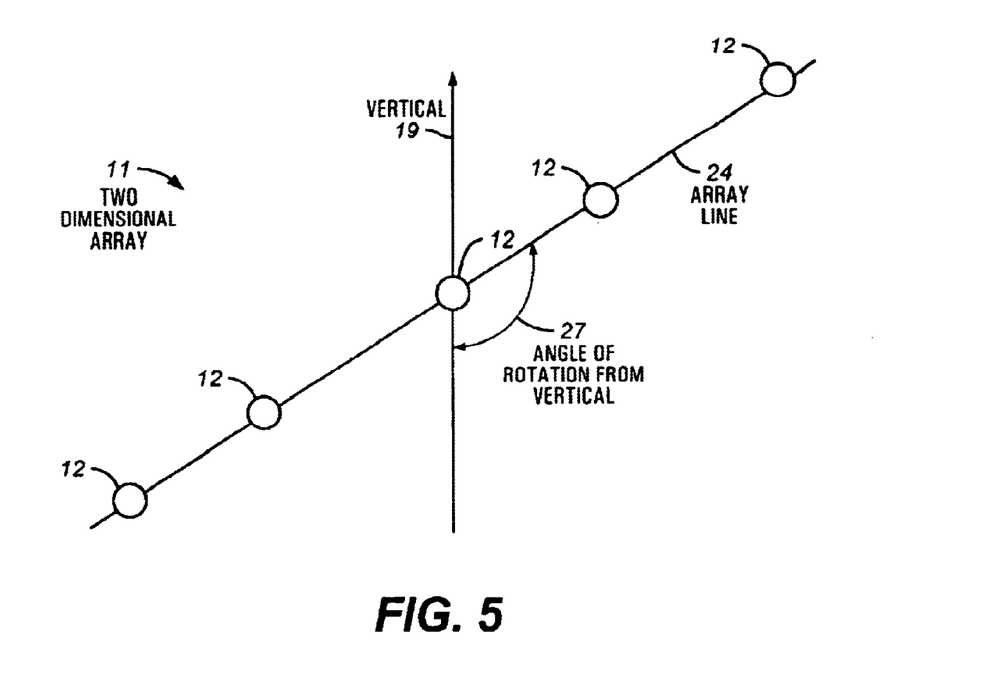
FIG. 5 is a schematic diagram of a towed seismic streamer array showing rotation of the array about the longitudinal axis of the array.

Turning now to FIG. 5, a two-dimensional array 11, positioned along line 24, is shown rotated at an angel theta 27 rotated theta degrees from vertical 19. The ability to rotate the array enables maneuvering the array in shallow water near a steep ocean bottom 14 inclined at angle theta.

The foregoing description is for purposes of example only and not intended to limit the scope of the present invention which is defined by the following claims.

What is claimed is:

1. A seismic streamer array tracking and positioning system comprising:
   a towing vessel for towing a seismic array;
   an array comprising a plurality of seismic streamers;
   an active streamer positioning device (ASPD) attached to at least one seismic streamer for positioning the seismic streamer relative to other seismic streamers within the array; and
   a master controller for issuing positioning commands to each ASPD to adjust a vertical and horizontal position of a first streamer relative to a second streamer within the array for maintaining a specified array geometry.

2. The apparatus of claim 1 further comprising:
   an environmental sensor for sensing environmental factors which influence the path of the towed array.

3. The apparatus of claim 1 further comprising:
   a tracking system for tracking the streamer positions versus time during a seismic data acquisition run and storing the positions versus time in a legacy database for repeating the positions versus time in a subsequent data acquisition; and
   an array geometry tracking system for tracking the array geometry versus time during a seismic data acquisition run and storing the array geometry versus time in a legacy database for repeating the array geometry versus time in a subsequent data acquisition run.

4. The apparatus of claim 3 wherein the master controller compares the positions of the streamers versus time and the array geometry versus time to a desired streamer position and array geometry versus time and issues positioning commands to the ASPDs to maintain the desired streamer position and array geometry versus time.

5. The apparatus of claim 4 wherein the master controller factors in environmental factors into the positioning commands to compensate for environmental influences on the positioning of the streamers and the array geometry.

6. The apparatus of claim 4 wherein the master controller compensates for maneuverability in the positioning commands to compensate for maneuverability influences on the positioning of the streamers and the array geometry.

7. The apparatus of claim 1 further comprising:
   a monitor for determining the status of each streamer, wherein the master controller adjusts the array geometry to compensate for a failed streamer.

8. The apparatus of claim 1 further comprising:
   a monitor for determining the status of each streamer, wherein the master controller adjusts the array geometry to move a failed streamer out of the array.

9. The apparatus of claim 1 further comprising:
   a monitor for determining the status of each streamer, wherein the master controller detaches a failed streamer from the array.

10. The apparatus of claim 1 wherein the array geometry comprises a plurality of streamers positioned at a uniform depth.

11. The apparatus of claim 1 wherein the array geometry comprises a plurality of streamers positioned at a plurality of depths for varying temporal resolution of the array.

12. The apparatus of claim 1 wherein the array geometry comprises a plurality of streamers positioned along a plane, wherein the plane is rotated at an angel theta with respect to the longitudinal axis of the array.

13. The apparatus of claim 4 wherein the array geometry is tracked via satellite and communicated to the master controller.

14. A seismic streamer array tracking and positioning system comprising:
   a towing vessel for towing a seismic array;
   a seismic streamer array comprising a plurality of seismic streamers;
   an active streamer positioning device (ASPD) attached to each seismic streamer for positioning each seismic streamer;
   a master controller for issuing vertical and horizontal positioning commands to each ASPD for maintaining a specified array geometry;
   an environmental sensor for sensing environmental factors which influence the towed path of the towed array;
   a tracking system for tracking the streamer horizontal and vertical positions versus time during a seismic data acquisition run;
   an array geometry tracking system for tracking the array geometry versus time during a seismic data acquisition run, wherein the master controller compares the vertical and horizontal positions of the streamers versus time and the array geometry versus time to desired streamer positions and array geometry versus time and issues positioning commands to the ASPDs to maintain the desired streamer positions and array geometry versus time.

15. The apparatus of claim 14 wherein the master controller factors in environmental measurements into the positioning commands to compensate for environmental influences on the positions of the streamers and the array geometry.

16. The apparatus of claim 14 wherein the master controller compensates for maneuverability in the positioning commands to compensate for maneuverability influences on the positioning of the streamers and the array geometry.

17. The apparatus of claim 14 further comprising:
   a monitor for determining the status of each streamer, wherein the master controller adjusts the array geometry to compensate for a failed streamer.

18. The apparatus of claim 14 further comprising:
   a monitor for determining the status of each streamer, wherein the master controller adjusts the array geometry to move the failed streamer out of the array.

19. A seismic streamer array tracking and positioning system comprising:
   a towing vessel for towing a seismic array;
   a seismic streamer array comprising a plurality of seismic streamers;
   an active streamer positioning device (ASPD) attached to each seismic streamer for vertically and horizontally positioning each seismic streamer relative to the array;
   a master controller for issuing positioning commands to each ASPD for maintaining a specified array geometry;

an environmental sensor for sensing environmental factors which influence the path of the towed array;

a tracking system for tracking the streamer positions versus time during a seismic data acquisition run;

an array geometry tracking system for tracking the array geometry versus time during a seismic data acquisition run, wherein the master controller compares the positions of the streamers versus time and the array geometry versus time to a desired position and array geometry versus time and issues positioning commands to the ASPDs to maintain the desired position and array geometry versus time, wherein the master controller factors in environmental and maneuverability factors into the positioning commands to compensate for environmental and maneuverability influences on the position of the streamers and the array geometry; and a monitor for determining the status of each streamer, wherein the master controller adjusts the array geometry to compensate for a failed streamer and removes the failed streamer from the array.

20. A seismic streamer array tracking and positioning system comprising:

a towing vessel for towing a seismic array;

a seismic streamer array comprising a plurality of seismic streamers;

an active streamer positioning device (ASPD) attached to each seismic streamer for vertically and horizontally positioning each seismic streamer relative to the array; and a master controller for issuing positioning commands to each ASPD for maintaining a specified array path.

21. The apparatus of claim 20 wherein the master controller issues positioning commands to the towing vessel for maintaining a specified array path.

22. The apparatus of claim 20 further comprising:

a processor for calculating an optimal path for the seismic array for optimal coverage during seismic data acquisition over a seismic field;

a streamer behavior prediction processor which predicts array behavior; and wherein the master controller compensates for predicted streamer behavior in issuing vertical and horizontal positioning commands to the towing vessel and the ASPDs for positioning the array along the optimal path.

23. The apparatus of claim 22 wherein the master controller compensates for environmental factors in the positioning commands.

24. The apparatus of claim 23 wherein the master controller compensates for maneuverability factors in the positioning commands.

25. A seismic streamer array tracking and positioning system comprising:

a towing vessel for towing a seismic array;

a seismic streamer array comprising a plurality of seismic streamers;

an active streamer positioning device (ASPD) attached to each seismic streamer for vertically and horizontally positioning each seismic streamer relative to the array;

a master controller for issuing positioning commands to each ASPD and to the towing vessel for maintaining an optimal path, wherein the master controller further comprises a processor for calculating an optimal path for the seismic array for optimal coverage during seismic data acquisition over a seismic field, and a streamer behavior prediction processor which predicts array behavior, wherein the master controller compensates for predicted streamer behavior in issuing positioning commands to the towing vessel and the ASPDs for positioning the array along the optimal path, wherein the master controller compensates for environmental and maneuverability factors in the positioning commands.

26. A method for tracking and positioning a seismic streamer array comprising:

for towing a seismic array comprising a plurality of seismic streamers;

attaching an active streamer positioning device (ASPD) each seismic streamer for positioning the seismic streamer relative to other seismic streamers within the array; and issuing vertical and horizontal positioning commands to each ASPD for maintaining a specified array geometry.

27. The method of claim 26 further comprising:

providing an environmental sensor for sensing environmental factors which influence the path of the towed array.

28. The method of claim 26 further comprising:

providing a tracking system for tracking the streamer positions versus time during a seismic data acquisition run and storing the positions versus time in a legacy database for repeating the positions versus time in a subsequent data acquisition; and providing an array geometry tracking system for tracking the array geometry versus time during a seismic data acquisition run and storing the array geometry versus time in a legacy database for repeating the array geometry versus time in a subsequent data acquisition run.

29. The method of claim 28 wherein the master controller compares the positions of the streamers versus time and the array geometry versus time to a desired streamer position and array geometry versus time and issues positioning commands to the ASPDs to maintain the desired streamer position and array geometry versus time.

30. The method of claim 29 wherein the master controller factors in environmental factors into the positioning commands to compensate for environmental influences on the positioning of the streamers and the array geometry.

31. The method of claim 30 wherein the master controller compensates for maneuverability in the positioning commands to compensate for maneuverability influences on the positioning of the streamers and the array geometry.

32. The method of claim 26 further comprising:

providing a monitor for determining the status of each streamer, wherein the master controller adjusts the array geometry to compensate for a failed streamer.

33. The method of claim 26 further comprising:

providing a monitor for determining the status of each streamer, wherein the master controller adjusts the array geometry to move a failed streamer out of the array.

34. The method of claim 26 further comprising:

providing a monitor for determining the status of each streamer, wherein the master controller detaches a failed streamer from the array.

35. The method of claim 26 wherein the array geometry comprises a plurality of streamers positioned at a uniform depth.

36. The method of claim 26 wherein the array geometry comprises a plurality of streamers positioned at a plurality of depths for varying temporal resolution of the array.

37. The method of claim 26 wherein the array geometry comprises a plurality of streamers positioned along a plane, wherein the plane is rotated at an angel theta with respect to the longitudinal axis of the array.

38. The method of claim 29 wherein the array geometry is tracked via satellite and communicated to the master controller.

39. A method for tracking and positioning a seismic streamer array comprising:

towing a seismic array comprising a plurality of seismic streamers from a towing vessel;

attaching an active streamer positioning device (ASPD) to each seismic streamer for positioning each seismic streamer;

issuing positioning commands from a master controller to each ASPD to adjust vertical and horizontal position of a first streamer relative to a second streamer in the array for maintaining a specified array geometry;

sensing environmental factors which influence the towed path of the towed array;

tracking the streamer positions versus time during a seismic data acquisition run;

tracking the array geometry versus time during a seismic data acquisition run, wherein the master controller compares the positions of the streamers versus time and the array geometry versus time to desired streamer positions and array geometry versus time and issues positioning commands to the ASPDs to maintain the desired streamer positions and array geometry versus time.

40. The method of claim 39 wherein the master controller factors in environmental measurements into the positioning commands to compensate for environmental influences on the positions of the streamers and the array geometry.

41. The method of claim 39 wherein the master controller compensates for maneuverability in the positioning commands to compensate for maneuverability influences on the positioning of the streamers and the array geometry.

42. The method of claim 39 further comprising:

determining the status of each streamer, wherein the master controller adjusts the array geometry to compensate for a failed streamer.

43. The method of claim 39 further comprising:

providing a monitor for determining the status of each streamer, wherein the master controller adjusts the array geometry to move the failed streamer out of the array.

44. A method for tracking and positioning a seismic streamer array comprising:

towing a seismic array comprising a plurality of seismic streamers from a towing vessel;

issuing vertical and horizontal positioning commands to each ASPD for maintaining a specified array geometry;

sensing environmental factors which influence the path of the towed array;

tracking the streamer positions versus time during a seismic data acquisition run;

tracking the array geometry versus time during a seismic data acquisition run, wherein the master controller compares the positions of the streamers versus time and the array geometry versus time to a desired position and array geometry versus time and issues positioning commands to the ASPDs to maintain the desired position and array geometry versus time, wherein the master controller factors in environmental and maneuverability factors into the positioning commands to compensate for environmental and maneuverability influences on the position of the streamers and the array geometry; and determining the status of each streamer, wherein the master controller adjusts the array geometry to compensate for a failed streamer and removes the failed streamer from the array.

45. A method for tracking and positioning seismic streamer array comprising:

towing a seismic array comprising a plurality of seismic streamers;

attaching an active streamer positioning device (ASPD) attached to each seismic streamer for positioning each seismic streamer; and issuing vertical and horizontal positioning commands to each ASPD for maintaining a specified array path.

46. The method of claim 45 wherein a master controller issues positioning commands to the towing vessel for maintaining a specified array path.

47. The method of claim 45 further comprising:

calculating an optimal path for the seismic array for optimal coverage during seismic data acquisition over a seismic field;

predicting array behavior; and compensating for predicted streamer behavior in issuing positioning commands to the towing vessel and the ASPDs for positioning the array along the optimal path.

48. The method of claim 47 wherein the master controller compensates for environmental factors in the positioning commands.

49. The method of claim 48 wherein the master controller compensates for maneuverability factors in the positioning commands.

50. A method for tracking and positioning a seismic streamer array comprising:

towing a seismic array comprising a plurality of seismic streamers;

attaching an active streamer positioning device (ASPD) attached to each seismic streamer for positioning each seismic streamer;

issuing horizontal and vertical positioning commands to each ASPD and to the towing vessel for maintaining an optimal path, calculating an optimal path for the seismic array for optimal coverage during seismic data acquisition over a seismic field, and a behavior prediction processor which predicting array behavior, wherein the master controller compensates for predicted streamer behavior in issuing positioning commands to the towing vessel and the ASPDs for positioning the array along the optimal path, wherein the master controller compensates for environmental and maneuverability factors in the positioning commands.

* * * * *